United States Patent [19]

Fedder

[11] Patent Number: 5,065,350

[45] Date of Patent: Nov. 12, 1991

[54] METHOD AND APPARATUS FOR LEAK TESTING

[75] Inventor: Stephen C. Fedder, Southfield, Mich.

[73] Assignees: William L. Sweet, Marine City; Anthony J. Skudrna, Harsens Island, both of Mich. ; a part interest

[21] Appl. No.: 493,213

[22] Filed: Mar. 14, 1990

[51] Int. Cl.$^5$ ............................................. G01M 3/26
[52] U.S. Cl. ............................... 364/571.03; 364/507; 364/558; 73/40
[58] Field of Search ................. 364/507, 506, 571.04, 364/571.03, 558; 73/49.2, 49.7, 37, 40

[56] References Cited

U.S. PATENT DOCUMENTS

| | | | |
|---|---|---|---|
| Re. 33,075 | 10/1989 | Holm et al. | 73/40 |
| 4,523,452 | 6/1985 | Brayman | 73/40 |
| 4,532,795 | 8/1985 | Brayman et al. | 73/40 |
| 4,896,530 | 1/1990 | Lehmann | 73/49.2 |
| 4,977,528 | 12/1990 | Norris | 364/571.04 |

Primary Examiner—Parshotam S. Lall
Assistant Examiner—S. A. Melnick
Attorney, Agent, or Firm—Barnes, Kisselle, Raisch, Choate, Whittemore & Hulbert

[57] ABSTRACT

A method of and apparatus for testing the chamber of a test part for leaks in which the chamber is filled with gas under pressure and the differential pressure drop over a predetermined interval of time is determined. The temperature of the part being tested is determined, and a storage table of correction values corresponding to the estimated differential pressure drop attributable to the temperature of the part is provided. The correction value for the temperature of the part is selected from the storage table and substracted from the measured differential pressure drop to obtain a corrected differential pressure drop. If the corrected differential pressure drop is within a range below a predetermined amount, a fraction of it is summed back to the storage table to adjust the selected correction value.

8 Claims, 2 Drawing Sheets

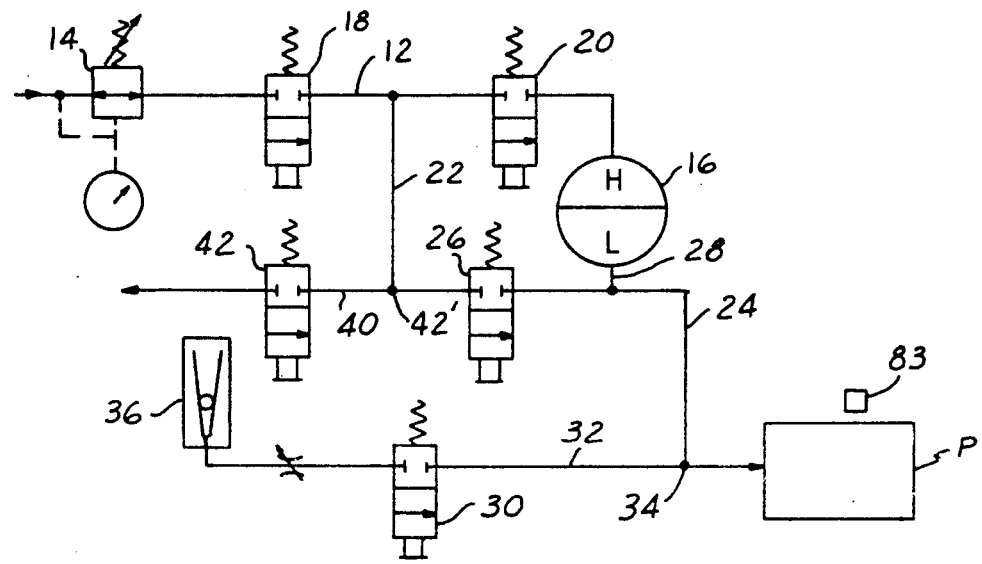
FIG.1
FIG.2
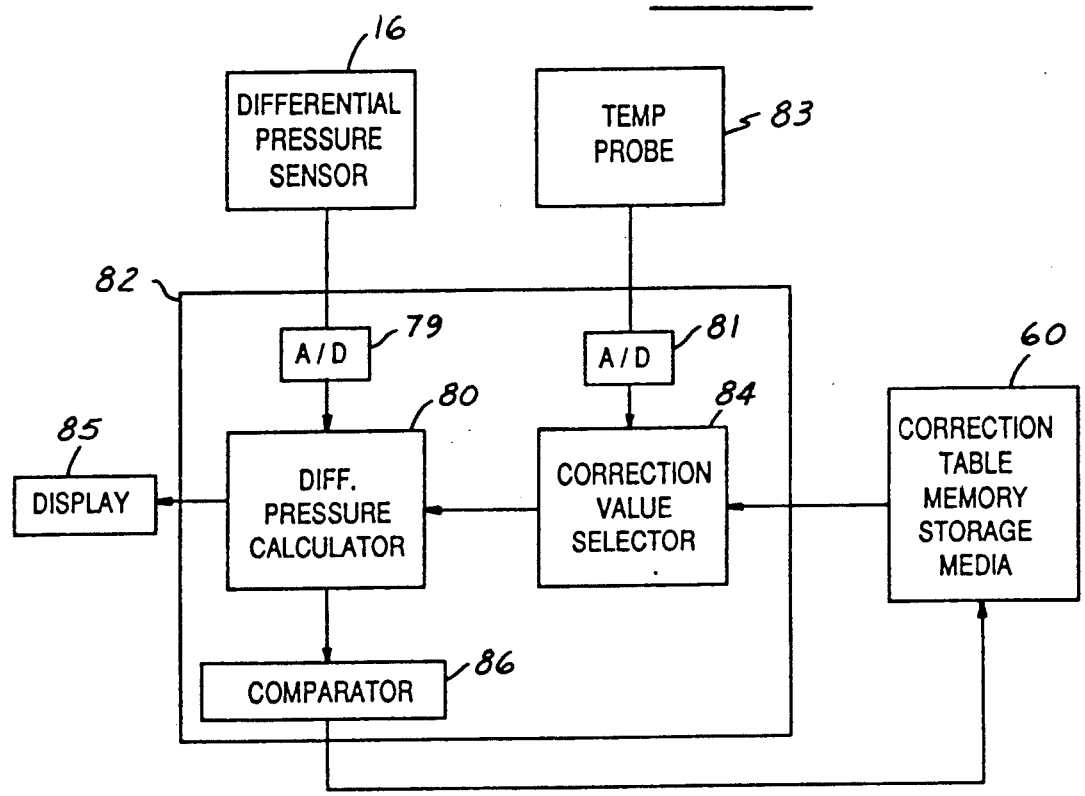

METHOD AND APPARATUS FOR LEAK TESTING

This invention relates generally to gas leak technology and more particularly to a method of and apparatus for detecting leaks in the chamber of a test part.

BACKGROUND AND SUMMARY

The measurement of leak rate by differential pressure loss is a standard leak test technique. However, the present invention not only measures leak rate by differential pressure loss but also compensates for the temperature of the test part and provides a system for "fine-tuning" the temperature correction.

Further in accordance with the invention, and as will become more apparent from the specific embodiment about to be described, the chamber of a test part is filled with gas under pressure and the pressure drop over a predetermined test period is measured. Because it has been discovered that temperature has an affect on pressure drop, the measured pressure drop is corrected to compensate for the temperature of the test part. The amount of the compensation is derived from a table of estimated correction values. These correction values are adjusted and fine-tuned during the course of the testing of a run of test parts.

The object of this invention is to provide a method of and apparatus for leak testing having the foregoing features. Other objects, features and advantages of the invention will become more apparent as the following description proceeds, especially when considered with the accompanying drawings.

BRIEF DESCRIPTION OF THE DRAWINGS

FIG. 1 is a diagrammatic view of apparatus for carrying out the invention.

FIG. 2 is a schematic representation of the leak test hardware.

DETAILED DESCRIPTION

Figure 3:
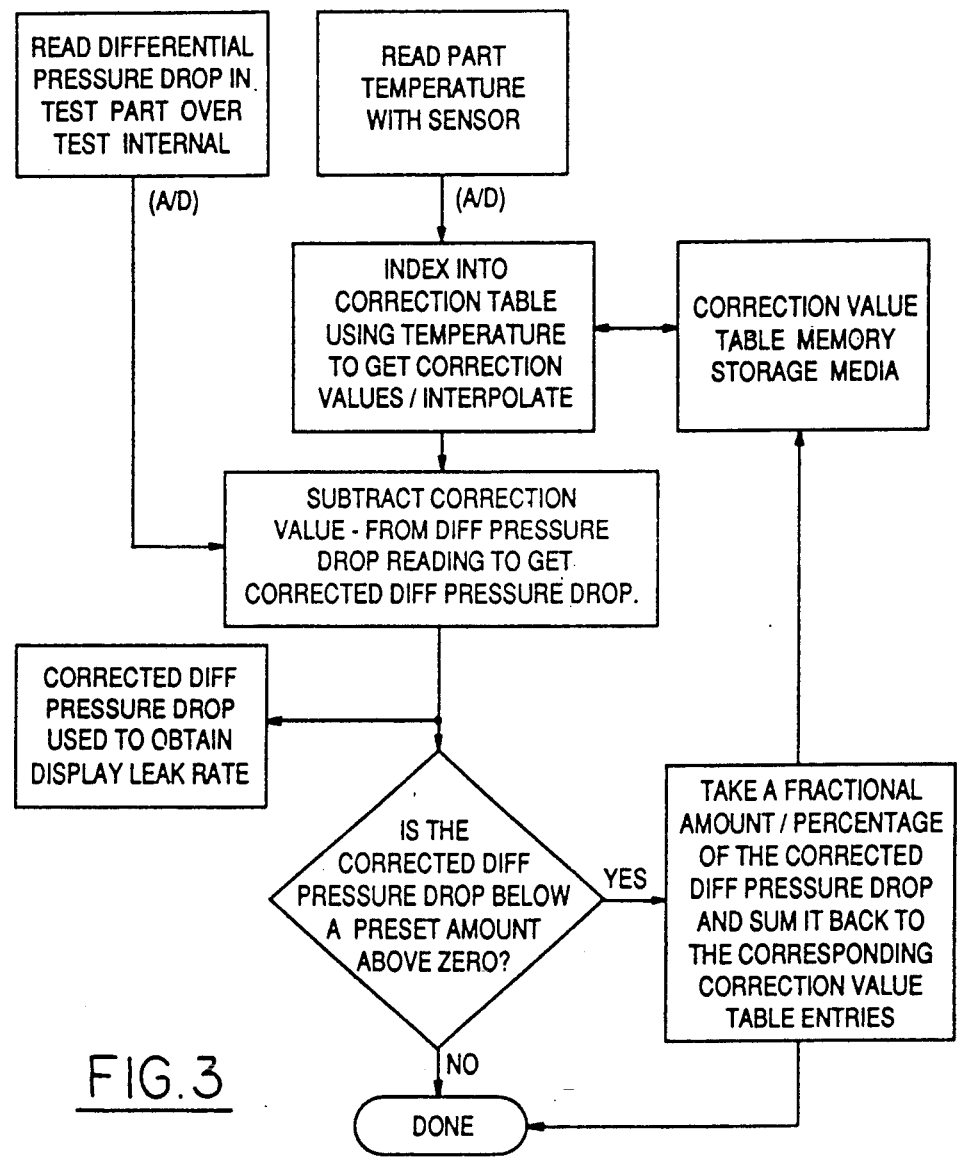
FIG. 3 is a flow chart representation of the leak test software.

Referring now more particularly to the drawings, and especially FIG. 1, air from a pressure source is fed into a line 12 through a pressure regulator 14 to one side of a differential pressure sensor 16. In this line 12 between the pressure regulator 14 and the sensor 16 are a fill valve 18 and a reference stabilize valve 20, both solenoid operated. A line 22 connected to line 12 between valves 18 and 20 leads to line 24 which runs through the solenoid-operated leak stabilize valve 26 to the test part P, which may, for example, be an engine block. The opposite side of the pressure sensor 16 is connected to line 24 between the leak stabilize valve 26 and the test part P by line 28. A solenoid-operated valve 30 in a line 32 connected to line 24 at point 34, when open, may be used with a needle valve and flow gauge 36 for calibration purposes. A line 40 extending from the junction 42' between lines 22 and 24 leads to vent through a solenoid-operated vent valve 42.

A part P to be tested is connected to line 24 as indicated in the drawing. The leak test cycle is started with the calibrated leak valve 30 and vent valve 42 closed and the fill valve 18 and two stabilize valves 20 and 26 open to allow the system to come up to the regulated air pressure. The system is allowed to fill for a period of time, at which point the fill and stabilize valves 18, 20 and 26 are closed to allow the pressure to stabilize on the reference and part (leak) sides of the differential pressure sensor. After a short delay, the vent valve 42 is opened to allow air pressure behind the two stabilize valves 20 and 26 to bleed out, in order to insure that no makeup air pressure enters into the test system. After the stabilization time to allow the readings to settle, a differential pressure reading is taken. After another delay time, a second differential pressure reading is taken in order to calculate the differential drop per unit of time. At that point, the temperature of the test part is read, to be used in the leak rate calculation.

Because temperature influences the pressure drop, the measured differential pressure drop is corrected to compensate for the temperature of the part. The amount of the correction is derived from a table (sometimes called a "bucket" table) of correction values. This table is developed by subjecting a "good" part, that is a part that is known to be leak-free, to the same testing procedure described herein at various different part temperatures within a range of temperatures at which parts are likely to be tested in actual practice. Thus a "good" part may be tested at a plurality of different temperatures (at least two) and a curve of correction values developed by plotting points representative of the pressure drops at those temperatures and constructing a line connecting the plotted points.

Figure 4:
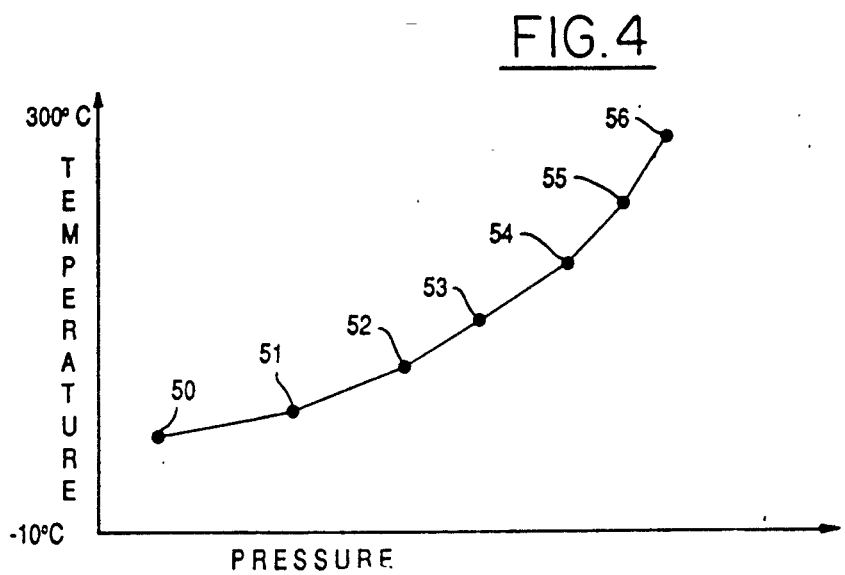
FIG. 4 is a diagram showing a curve from which correction value offsets due to part temperature can be obtained.

FIG. 4 illustrates a bucket table in which pressure drop is plotted against part temperature at a plurality of points 50–56 and a line is constructed connecting those points. Knowing the temperature of a part being tested, the differential pressure drop due to temperature may be determined by reference to the table in FIG. 4. It must be understood that the table in FIG. 4 provides only an estimate of differential pressure drop due to part temperature since the differential pressure drop curve has been developed by straight line segments connecting only a few plotted points.

The table is put into a memory storage media 60. The table is adjusted or fine-tuned as testing proceeds from one part to the next as will be explained more clearly hereinafter.

A comparator 70 performs part of a very important aspect of the invention, which is fine-tuning the bucket table. If a part registers a corrected differential pressure drop which is relatively very small, that is within a range having a maximum value which exceeds zero by a relatively small amount, an assumption is made that the part, which registers near zero leak, is actually true zero, or leak free, and that the differential pressure drop is due solely to error in the compensation value. Therefore, and in that case, the corrected pressure drop is fed back to the storage media 60 to adjust or fine-tune the correction value for that temperature of the part. Rather than adjust the correction value by the entire corrected pressure drop, it preferably is adjusted by only a fraction or percentage thereof. For example, if one hundred parts are being tested, the corrected value entry may be adjusted only by one hundredth (1/100) of the differential pressure drop.

Referring to FIGS. 2 and 3, after a stabilizing time to allow readings to settle, a first differential pressure reading is taken and transmitted through analog to digital converter 79 to the calculator 80 of a computer system 82. After another delay, a second differential pressure reading is taken and transmitted to the calculator 80 which calculates the differential pressure drop per unit of time. At that point in time, the temperature of the test part is read by a temperature probe 83. The temperature reading is transmitted through analog to digital converter 81 to a correction value selector 84 which then selects or extracts the two nearest correction values from the correction table memory storage media 60 for that particular part temperature and linearly interpolates between the two values to calculate the actual correction value for that temperature and feeds the actual correction value to the calculator 80 which subtracts the actual correction value from the measured differential pressure drop to provide a part temperature compensated differential pressure drop.

The corrected differential pressure drop is converted to a leak rate and transmitted to a display 85, and if below a certain amount, the part has passed the test.

The corrected differential pressure drop is also transmitted to a comparator 86 which determines whether the corrected differential pressure drop is low enough that, on the average, the differential pressure drop of parts being measured is in a range below a value at which the reading is most likely due to error in the correction factor. It should be understood that that value will vary depending upon the type of part being tested, but usually is well below the upper limit of leak tolerance for an acceptable part. If the corrected differential pressure drop is within that range, then it is assumed that the part is leak-free and the pressure drop is solely the result of correction value error. Accordingly, a fraction or a percentage of the corrected differential pressure drop is fed back to the correction table memory storage media 60 and averaged into the table to adjust or fine-tune the correction value which had been selected for temperature compensation. In this way, the table of correction value offsets in the memory storage media 60 is continually adjusted throughout the duration of the testing of a run of test parts. The entire corrected differential pressure drop could be fed back to the storage media for adjustment purposes, but it is preferred to feed back only a fraction thereof to minimize the short term influence of actual low leakage parts on the correction values. This allows for accurate measurement of leak rates that are close to zero. Of course, if the corrected pressure drop is above said range, then there is no feed back to the storage media 60.

As an added benefit, this compensation method, because it looks at zero offset error as well as temperature, will not only compensate for linear and non-linear variations with part temperature, but also for adiabatic effects and sensor related offset drifts in the zero calibration of the instrument.

As an example of the leak test thus described, let it be assumed that a part must have a corrected differential pressure drop of 20 millimeters (mm) of $H_2O$/sec. or less to pass. Assume also that a particular part has a measured differential pressure drop of $-10$ mm $H_2O$/sec., that the part is tested at a temperature of 60° C. and that the correction value entry for that part temperature is $-12$ mm $H_2O$/sec.

If the correction value entry of $-12$ mm $H_2O$/sec. is subtracted from the measured differential pressure drop of $-10$ mm $H_2O$/sec. to compensate for temperature, the corrected differential pressure drop is 2 mm $H_2O$/sec. The part, therefore, passes the leak test.

If the corrected differential pressure drop of 2 mm $H_2O$/sec. is within an established range, for example, below 2.5 mm $H_2O$/sec. and thus near enough to zero to be indicative of a leak-free condition, then a fraction of the corrected differential pressure drop of 2 mm $H_2O$/sec., for example 5% or 0.1 mm $H_2O$/sec., is fed back to the memory media 60 for adjustment or fine-tuning of the correction value entry for the temperature of the part tested. This would make the correction value at 60° C. $-11.9$ mm $H_2O$/sec. If, on the average, in this case, parts read a differential pressure drop of $-10$ mm $H_2O$/sec. at 60° C., the correction value would eventually adjust to $-10$ mm $H_2O$/sec.

What is claimed is:

1. A method of testing the chamber of a test part for leaks, comprising filling said chamber with gas under pressure, determining the differential pressure drop of the gas in said chamber over a predetermined interval of time, determining the temperature of the part being tested, providing a storage table of correction values corresponding to the estimated differential pressure drop of gas pressure in said chamber attributable to the temperature of the part, selecting from said storage table the correction value for the temperature of said part being tested, subtracting the selected correction value from the differential pressure drop thus determined to obtain a corrected differential pressure drop, and, if said corrected differential pressure drop is below a predetermined maximum amount, summing back to said storage table at least a fraction of said corrected differential pressure drop to adjust said selected correction value.

2. The method defined in claim 1, wherein said predetermined maximum amount is below the upper limit of leak tolerance for an acceptable part.

3. A method of testing the chamber of a test part for leaks, comprising filling said chamber with gas under pressure, determining the differential pressure drop of the gas in said chamber over a predetermined interval of time, determining the temperature of the part being tested, providing a storage table of correction values corresponding to the estimated differential pressure drop of gas pressure in said chamber attributable to the temperature of the part, selecting from said storage table the correction value for the temperature of said part being tested, subtracting the selected correction value from the differential pressure drop thus determined to obtain a corrected differential pressure drop, establishing a range of values corresponding to differential pressure drops below a predetermined maximum, determining whether the corrected differential pressure drop falls within said range, and summing back to said storage table at least a fraction of a corrected differential pressure drop falling within said range to adjust said selected correction value.

4. The method of testing defined in claim 3, wherein said storage table of correction values is initially made by filling a part which is substantially free of leaks with gas under pressure, determining the differential pressure drop of the gas in said chamber over a predetermined interval of time at a first temperature and again at a second different temperature, and developing a curve of correction values for temperatures between said first and second temperatures by plotting points representing the differential pressure drops at said first and second temperatures and constructing a line connecting said points.

5. The method of testing defined in claim 3, wherein said storage table of correction values is initially made by filling a part which is substantially free of leaks with gas under pressure, determining the differential pressure drop of the gas in said chamber over a predetermined interval of time and at a plurality of temperatures within a temperature range, and developing a curve of correction values for temperatures within said temperature range by plotting points representing the differential pressure drops at said plurality of temperatures and constructing a line connecting said points.

6. The method defined in claim 3, wherein said predetermined maximum amount is below the upper limit of leak tolerance for an acceptable part.

7. Apparatus for testing the chamber of a test part for leaks, comprising means for filling said chamber with gas under pressure, means for determining the differential pressure drop of the gas in said chamber over a predetermined interval of time, means for determining the temperature of the part being tested, means providing a storage table of correction values corresponding to the estimated differential pressure drop of gas pressure in said chamber attributable to the temperature of the part, means for selecting from said storage table the correction value for the temperature of said part being tested, means for subtracting the selected correction value from the differential pressure drop thus determined to obtain a corrected differential pressure drop, and means for determining whether the corrected differential pressure drop falls within an established range and for summing back to said storage table at least a fraction of a corrected differential pressure drop falling within said range to adjust said selected correction value.

8. Apparatus for testing the chamber of a test part for leaks, comprising means for filling said chamber with gas under pressure, means for determining the differential pressure drop of the gas in said chamber over a predetermined interval of time, means for determining the temperature of the part being tested, means providing a storage table of correction values corresponding to the estimated differential pressure drop of gas pressure in said chamber attributable to the temperature of the part, means for selecting from said storage table the correction value for the temperature of said part being tested, means for subtracting the selected correction value from the differential pressure drop thus determined to obtain a corrected differential pressure drop, and means for summing back to said storage table at least a fraction of a differential pressure drop below a predetermined maximum amount to adjust said selected correction value.

* * * * *